March 29, 1938.  C. B. GRAHAM  2,112,399
MIRROR HINGE
Filed Sept. 10, 1936  2 Sheets-Sheet 1
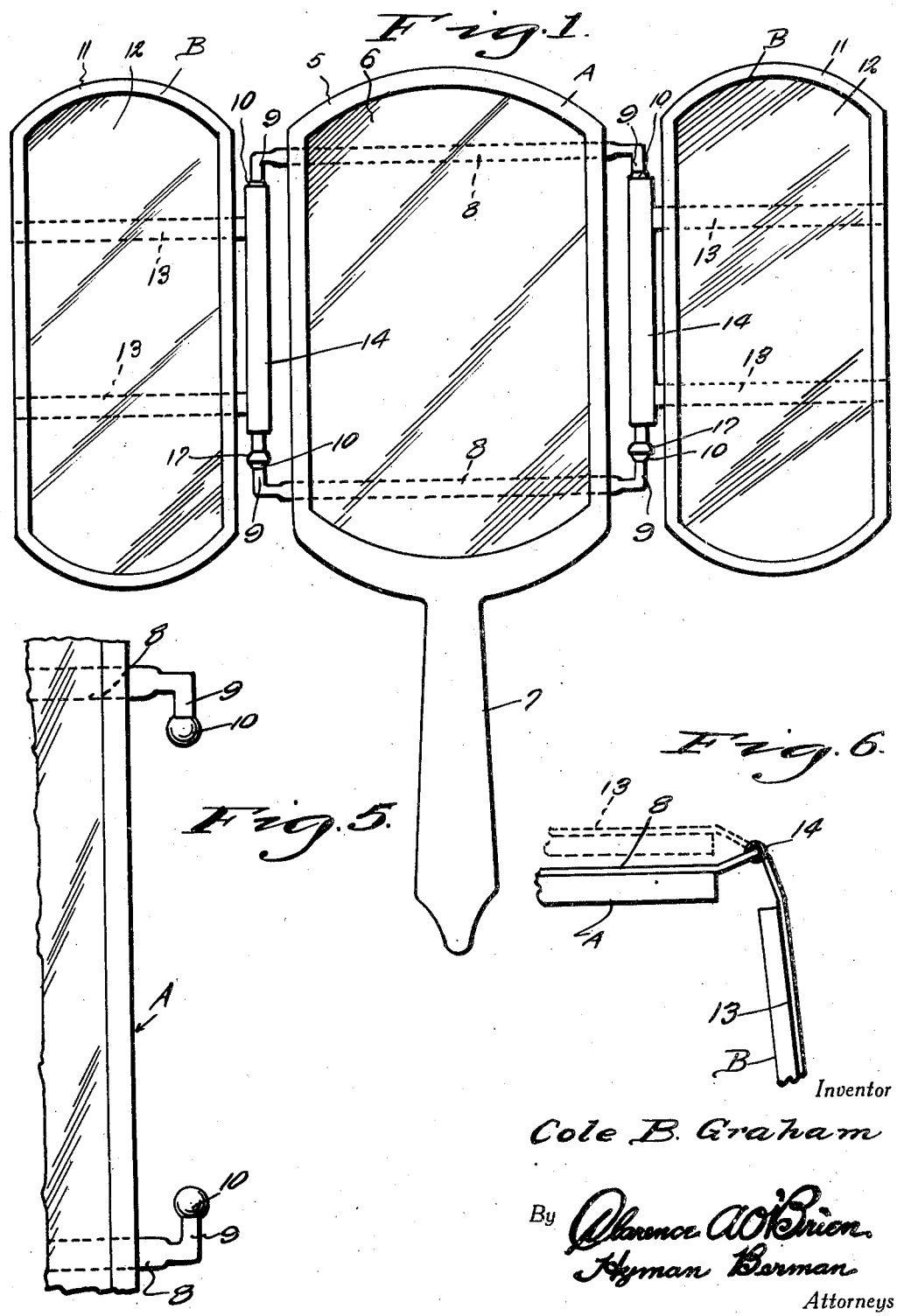
Inventor
Cole B. Graham
By Clarence A. O'Brien
Hyman Berman
Attorneys March 29, 1938.  C. B. GRAHAM  2,112,399
MIRROR HINGE
Filed Sept. 10, 1936   2 Sheets-Sheet 2
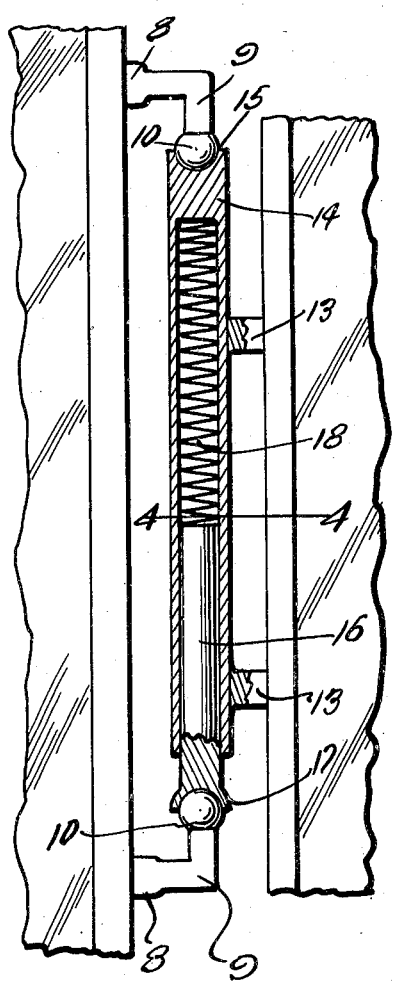
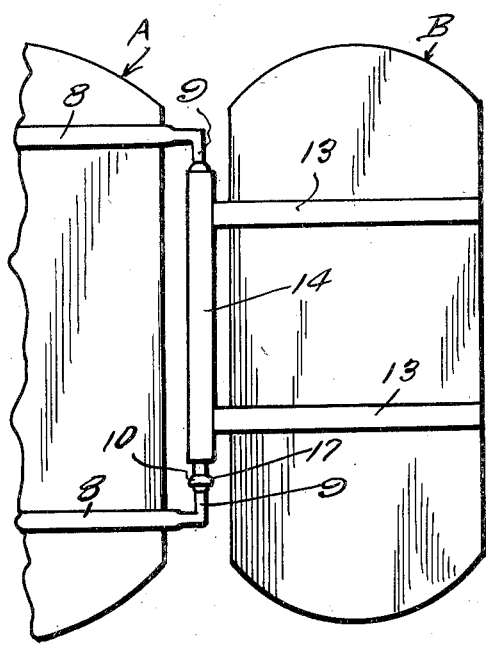
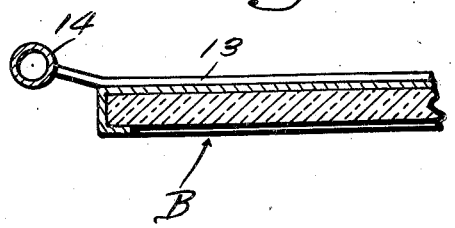
Inventor
Cole B. Graham
By Clarence A. O'Brien
Hyman Berman
Attorneys Patented Mar. 29, 1938

2,112,399

UNITED STATES PATENT OFFICE 2,112,399

MIRROR HINGE

Cole B. Graham, Greenwood, S. C.

Application September 10, 1936, Serial No. 100,193

2 Claims. (Cl. 16—176)

The present invention relates to a mirror hinge and aims to provide a plurality of panels adjustably connected together so that they may be placed in various angles with respect to one another.

Another important object of the invention resides in the provision of a mirror of this nature wherein the parts are capable of being readily adjusted, easily assembled and disassembled, are comparatively inexpensive to manufacture, clearly efficient and reliable in use.

With the above and numerous other objects in view as will appear as the description proceeds, the invention consists in certain novel features of construction, and in the combination and arrangement of parts as will be hereinafter more fully described and claimed.

Figure 1 is a front elevation of a mirror embodying the features of my invention.

Figure 2 is a fragmentary rear elevation thereof.

Figure 3 is an enlarged detail section through the hinge means.

Figure 4 is a detail sectional view taken substantially on the line 4—4 of Figure 3.

Figure 5 is a detail elevation showing a fragment of the center mirror element with the ends of the bolt carrying arm.

Figure 6 is a fragmentary top plan view.

Referring to the drawings in detail it will be seen that there is a front mirror element A and side mirror elements B—B. The element A includes a frame 5 in which is a mirror panel 6. A handle 7 depends from the bottom and frame. A pair of bars 8—8 extend across the back of the frame 5 beyond the side edges thereof and merge into arms 9—9 which extend toward each other and terminate in balls 10—10;

The side sections B include frames 11—11 in which are panels 12—12. Rods 13—13 extend across the back of each frame 11 and extend beyond one edge thereof and have fixed thereto a cylinder 14, the upper end of which is closed and formed with a socket 15 for receiving one of the balls 10. The plunger 16 is slidable in the cylinder and protrudes out of the other end thereof and terminates in a socket 17 for receiving one of the balls 10. A coil spring 18 is disposed in the cylinder and impinges against the plunger.

It is thought that the assembly and disassembly of the device is quite obvious. It will be seen that when assembled the sections may be swung at different angles with respect to each other. The mirror is designed as a hand vanity mirror primarily but may be used in other ways.

The present embodiment has been disclosed because it is a practical one but I do not wish to be limited to the details of construction except as limited in the appended claims.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim is:—

1. A hinge structure for hingedly connecting a plurality of mirror sections comprising a cylinder carried by one of the sections and open at one end, a spring projected plunger in the open end of the cylinder, a pair of arms projecting from the side edge of an adjacent mirror section and a swivel connection between the closed end of the cylinder and one of the arms and between the outer end of the plunger and the other of said arms.

2. A hinge structure for hingedly connecting a plurality of mirror sections comprising a cylinder carried by one of the sections and open at one end, a spring projected plunger in the open end of the cylinder, the closed end of the cylinder and the outer end of the plunger having sockets formed therein, a pair of arms projecting from the side edge of an adjacent mirror section and balls formed on the outer ends of said arms and seated in the respective sockets.

COLE B. GRAHAM.